US012481273B2

(12) United States Patent
Mansfield (10) Patent No.: US 12,481,273 B2
(45) Date of Patent: Nov. 25, 2025

(54) SYSTEM AND METHOD FOR COLLECTING REAL-TIME MANUFACTURING DATA USING AN INTERNET OF THINGS FACTORY GATEWAY

(71) Applicant: JABIL INC., St. Petersburg, FL (US)

(72) Inventor: Stephen Mansfield, St. Petersburg, FL (US)

(73) Assignee: JABIL INC.

( * ) Notice: Subject to any disclaimer, the term of this patent is extended or adjusted under 35 U.S.C. 154(b) by 903 days.

(21) Appl. No.: 17/306,792

(22) PCT Filed: Nov. 1, 2019

(86) PCT No.: PCT/US2019/059314
§ 371 (c)(1),
(2) Date: May 3, 2021

(87) PCT Pub. No.: WO2020/092863
PCT Pub. Date: May 7, 2020

(65) Prior Publication Data
US 2022/0128982 A1   Apr. 28, 2022

Related U.S. Application Data

(60) Provisional application No. 62/754,376, filed on Nov. 1, 2018.

(51) Int. Cl.
*H04L 67/10* (2022.01)
*G05B 19/418* (2006.01)

(52) U.S. Cl.
CPC ............ *G05B 19/41875* (2013.01); *G05B 2219/32368* (2013.01)

(58) Field of Classification Search
CPC .... G05B 19/41875; G05B 2219/32368; G05B 19/41855; H04L 67/02; H04L 67/10; H04L 67/12; H04L 67/562
See application file for complete search history.

(56) References Cited

U.S. PATENT DOCUMENTS 8,429,630 B2 * 4/2013 Nickolov ............ H04L 67/1021
717/148
8,510,476 B2 * 8/2013 Eastvold ................ H04L 67/56
709/224
(Continued)

FOREIGN PATENT DOCUMENTS

CN   105759766 A   7/2016
CN   106603659 A   4/2017
(Continued)

OTHER PUBLICATIONS

Chinese Office Action issued in App. No. CN201980079564, dated Feb. 2, 2024, 8 pages.
European Patent Office Communication issued in EP19878203, dated Feb. 28, 2024, 8 pages.
(Continued)

*Primary Examiner* — Patrick H Mackey
(74) *Attorney, Agent, or Firm* — Riverside Law LLP (57) ABSTRACT

A system and method for collecting real time manufacturing data from a factory having multiple machines therein using internet-of-things (IoT) connectivity, comprising: at least one gateway comprising at least one server, the at least one gateway receiving data from the multiple machines; at least one machine communications module (MCM) that applies to the received data at least factory, enterprise, and analytics applications, and which outputs command and control information from the applications to the at least one gateway to directly control operations of the multiple machines; wherein the gateway provides security isolation on the machine side of the gateway, and encryption, authentication, and authorization security on the MCM side of the gateway; and wherein the applications process and normalize data from at least a plurality of types and generations of the multiple machines.

13 Claims, 9 Drawing Sheets

(56) References Cited

U.S. PATENT DOCUMENTS

| | | | |
|---|---|---|---|
| 10,257,163 B2 * | 4/2019 | Rotvold | H04L 63/061 |
| 10,412,064 B2 * | 9/2019 | Funk | H04L 63/0471 |
| 10,554,625 B2 * | 2/2020 | Al-Khabbaz | H04L 63/0281 |
| 11,792,074 B2 * | 10/2023 | Geiger | H04L 67/12 |
| | | | 709/220 |
| 12,253,846 B2 * | 3/2025 | Brain | H04N 21/4728 |
| 2003/0220768 A1 * | 11/2003 | Perry | G05B 19/4183 |
| | | | 702/188 |
| 2017/0111373 A1 | 4/2017 | Morton | |
| 2017/0201504 A1 | 7/2017 | Funk | |
| 2018/0052451 A1 | 2/2018 | Billi Duran | |
| 2018/0129191 A1 | 5/2018 | Rodriguez | |
| 2018/0183779 A1 | 6/2018 | Krishan | |
| 2020/0225655 A1 * | 7/2020 | Cella | G05B 19/41875 |

FOREIGN PATENT DOCUMENTS

| | | |
|---|---|---|
| CN | 106953923 A | 7/2017 |
| CN | 107040459 A | 8/2017 |
| CN | 107179750 A | 9/2017 |
| CN | 108021108 A | 5/2018 |
| CN | 108089450 A | 5/2018 |
| CN | 108549353 A | 9/2018 |
| KR | 20180001650 A | 1/2018 |
| KR | 20180073918 A | 7/2018 |

OTHER PUBLICATIONS

Chinese Office Action issued in App. No. CN201980079564, dated Aug. 10, 2024, 8 pages.

* cited by examiner

SYSTEM AND METHOD FOR COLLECTING REAL-TIME MANUFACTURING DATA USING AN INTERNET OF THINGS FACTORY GATEWAY

CROSS-REFERENCE TO RELATED APPLICATIONS

This application claims the benefit of priority to International Application No. PCT/US2019/059314, filed Nov. 1, 2019; entitled: SYSTEM AND METHOD FOR COLLECTING REAL-TIME MANUFACTURING DATA USING AN INTERNET OF THINGS FACTORY GATEWAY, which claims priority to U.S. Provisional Application No. 62/754,376, filed Nov. 1, 2018, entitled: SYSTEM AND METHOD FOR COLLECTING REAL-TIME MANUFACTURING DATA USING AN INTERNET OF THINGS FACTORY GATEWAY; the entireties of which is incorporated herein by reference as if set forth in its entireties.

BACKGROUND

Field of the Disclosure

The present disclosure relates to manufacturing, and, more specifically, to a system and method for collecting manufacturing data using an IoT factory gateway.

Description of the Background

Today's manufacturing companies compete on a worldwide basis. Any improvements in the manufacturing processes, material velocity, product quality, test, packaging and shipping can have significant impact on a manufacturer's competitiveness.

The Internet of Things (IoT) can provide manufacturing planners insight into real-time actionable manufacturing data. The ability to analyze manufacturing data in real time can have a significant positive effect on manufacturing costs, quality and time to market.

SUMMARY

The gateway may comprise a data server that provides a convenient and secure way of accessing factory machine data. The gateway may be a 2-way server architecture that takes data from machines and makes that data available to various factory, enterprise and cloud applications. It also may take command and control information from the applications and directly control the operation of factor line machines.

The factory machine environment has little or no data, authentication or authorization security. The enterprise side demands robust security. The gateway provides security isolation on the factory machine side and robust encryption, authentication, and authorization security on the enterprise side.

The gateway architecture may take into consideration multiple generations of machines. Factories have many machines that have been acquired over several years. Machines may have differences in make/model/variation that make integration difficult. The disclosed MCM allows all machines in factories to be integrated and normalized into a single common platform.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

The embodiments include a method for conveniently collecting IoT data from a manufacturing facility with a diverse set of machines and manufacturing processes. The embodiments easily and securely capture manufacturing data that can be used as input to various Manufacturing Execution Systems (MES), Enterprise Resource Planning Systems (ERP), process control, and manufacturing analytics.

The management of many machines in an automated environment is extremely challenging. Many of the machines may lack common data and command/control standards. Often, complex work arounds are needed to extract, emulate or duplicate machine data. The work arounds make development of automated systems complex and the integration process much more difficult. The embodiments allow easy and fast integration of automated machine inventory with Machine Execution Systems (MES) and Enterprise Resource Planning (ERP) automation systems and cloud-based applications.

Figure 1:
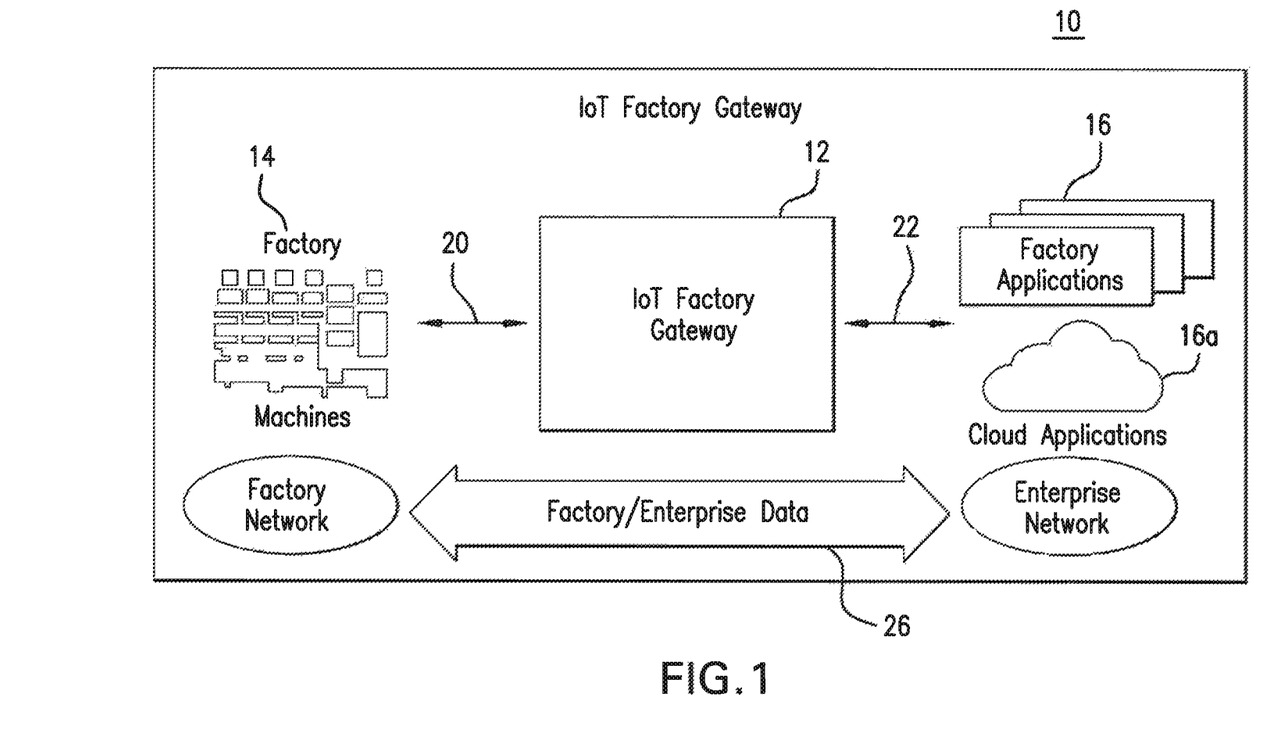
FIG. 1 is an illustration of an embodiment of the disclosure.

As illustrated in FIG. 1, the gateway 10 thus provided may include a software data gateway server 12 between the automated factory machines 14 and MES, ERP and/or other factory applications 16. On the factory network side, this creates a secure isolated connection 20 between the machine and the gateway. This connection handles multiple industry and proprietary communications protocols using a Machine Communications Module (MCM) architecture. The gateway 12 can not only extract machine data but also control the machines automation processes using this connection.

On the enterprise network side, the embodiments provide a convenient and secure application programming interface (API) for access to machine data 22. Factory applications 16 accessing data "see" a common interface without the need for machine awareness.

The foregoing enables factory engineers to customize the gateway for special data requirements. The gateway provides a convenient cloud-based streaming data subscription service. This allows easy cloud application access to automated factory data.

This readily enables integration and connectivity for various automated factory machines with factory, enterprise and cloud applications. The embodiments provide several services that make application and machine integration easier.

The embodiments automate the collection of big data 26, the performance of analysis thereof, and the making of decisions related thereto in real-time. More specifically, factory data collection generally takes two forms-historical and real-time. Historical data is data that is collected at the end of a shift, day, week, month, quarter, or year, by way of example. However, analysis and decision making are always after the fact if historical data is exclusively used. Historic data capture and decision-making is thus often slow to positively impact manufacturing processes.

Real-time data collection collects and makes available data instantaneously. However, often the analyzing of real-time data is problematic due to slow data networks and access to fast computing resources in many factories.

Factory analytics may be categorized as Statistical Process Control (SPC) and Progressive Process Improvement (PPI). SPC is used to measure key manufacturing metrics to better manage product throughput, efficiency, and quality. Manufacturing line data is collected and analyzed using statistical process models. Output from the models is usually in the form of statistical variances. Out-of-tolerance process and problem issues may be highlighted. However, SPC is limited to just one or two degrees of statistical correlation, and thus SPC provides only limited insight to the data or processes.

Figure 2:
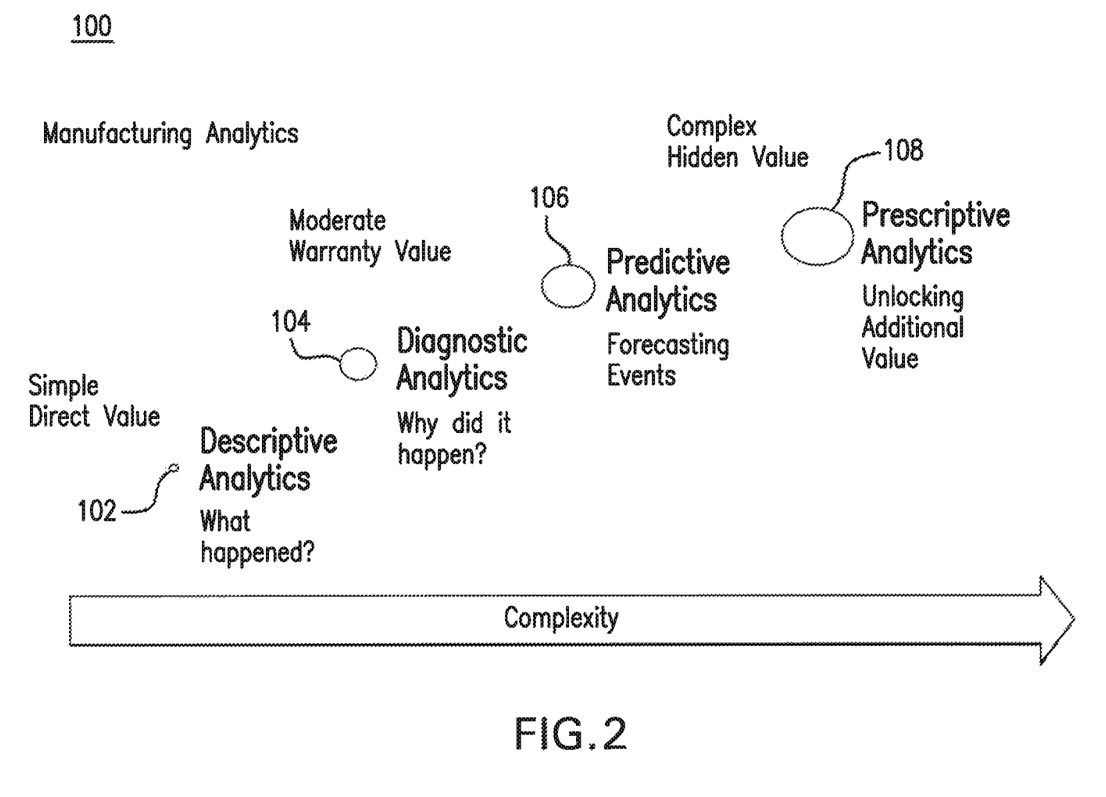
FIG. 2 is an illustration of an embodiment of the disclosure.

PPI analyzes many degrees of correlation and provides much more insight into manufacturing processes improvement. As illustrated in FIG. 2, PPI analytics 100 are popular due to the sophistication of the algorithms and the introduction of Internet of Things (IoT) and low-cost cloud computing. Algorithms include advanced machine learning, artificial intelligence (AI), and deep AI.

PPI algorithms in the embodiments are categorized into 4 increasingly complex analytics categories; descriptive 102, diagnostic 104, predictive 106, and prescriptive 108. Descriptive and diagnostic algorithms are used in many manufacturing processes today. Predictive and Prescriptive have had recent application by manufacturers looking for the hidden value and a competitive edge in manufacturing processes.

Descriptive analytics focus on what happened and use the output to correct the process failure. Descriptive analytics focus on the failure of the process. Diagnostic analytics focus on why a failure happened and determine the root cause failure. They also help identify process faults so that the root failure does not occur again. Predictive analytics forecast future events. They generate forecasts, prevent downtime, decrease warranty expenses, and improve overall productivity by coupling technology and process insights with data insights. Algorithms typically include complex machine learning algorithms.

Prescriptive analytics understand the complex hidden value of manufacturing processes. They identify future actions with focus on cost reduction, quality improvements, and new revenue opportunities. Algorithms often include machine learning, artificial intelligence (AI) and deep AI.

Big data and analytics are increasingly becoming a significant competitive edge for manufacturers. These new methods are giving manufacturers new insight into the value of their end to end manufacturing processes. The concept of big data and Progressive Process Improvement analytics can have a dramatic effect on all aspects of manufacturing.

Real-Time Actionable Data is the process of integrating very large streams of manufacturing data with fast real-time decision-oriented MES software. It utilizes large scale IoT, high performance compute clusters, very fast communication networks and advanced PPI analytics. Automated process decisions can be made almost instantaneously. Integrated with MES and ERP software, Real-Time Actionable Data algorithms can see issues and roadblocks in manufacturing processes long before they become obvious.

Figure 3:
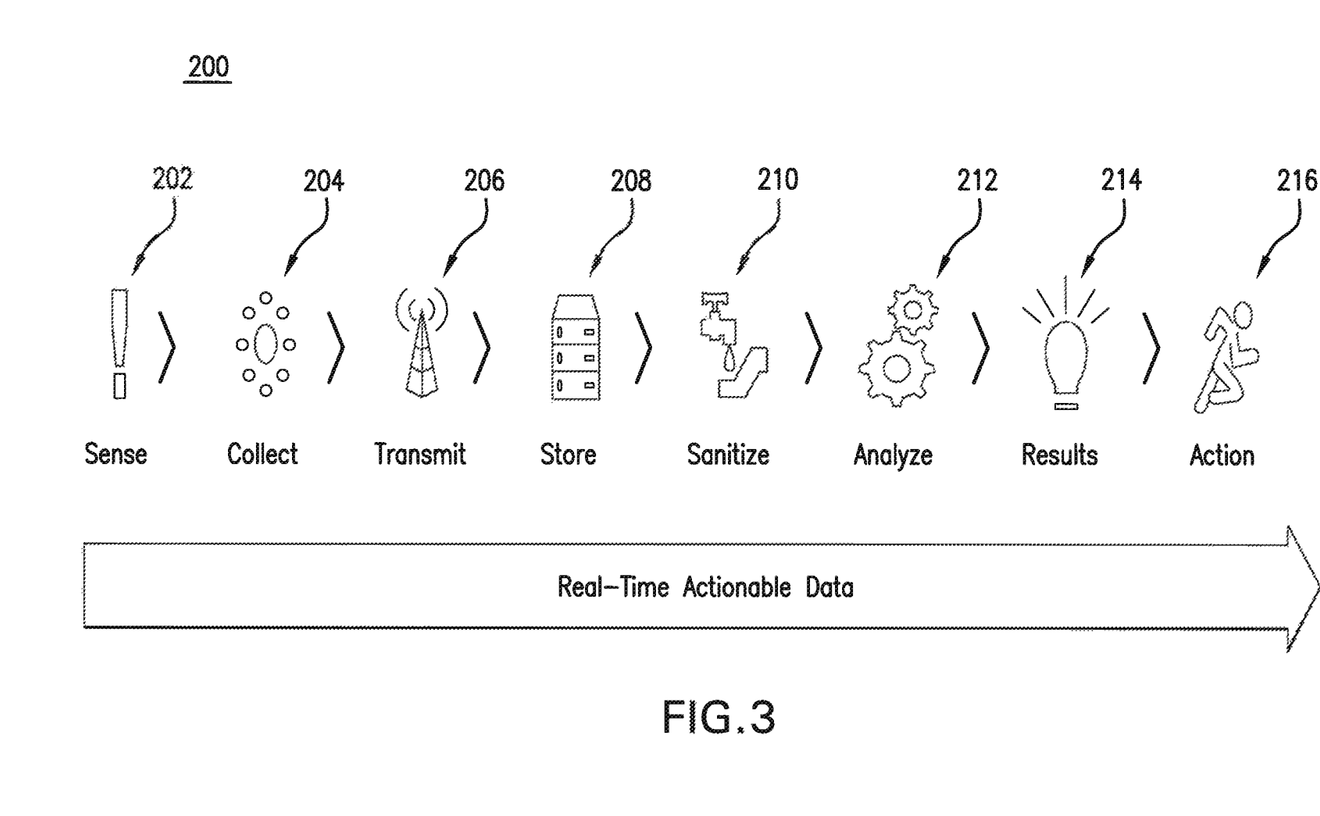
FIG. 3 is an illustration of an embodiment of the disclosure.

FIG. 3 illustrates the Real-Time Actionable Data process 200. Data is collected from many manufacturing sensors 202 simultaneously. The data is gathered 204 and then transmitted 206 to a compute facility. The data is first stored 208 and then sanitized 210. Sanitizing is the process of fixing errors that might have been injected into the data stream. The data is then processed using PPI analytics 212. The results 214 are used to make actionable process decisions 216. This process is often repeated many thousands of times per second.

Real-Time Actionable Data requires a constant stream of data. Using IoT is a very effective means of collecting and creating the data stream. However, many of the machines used in manufacturing today lack data and communications standards to effectively integrate within a large corporate enterprise. Another issue is the complete lack of security and the ability to integrate into a federated enterprise security environment.

Figure 4A:
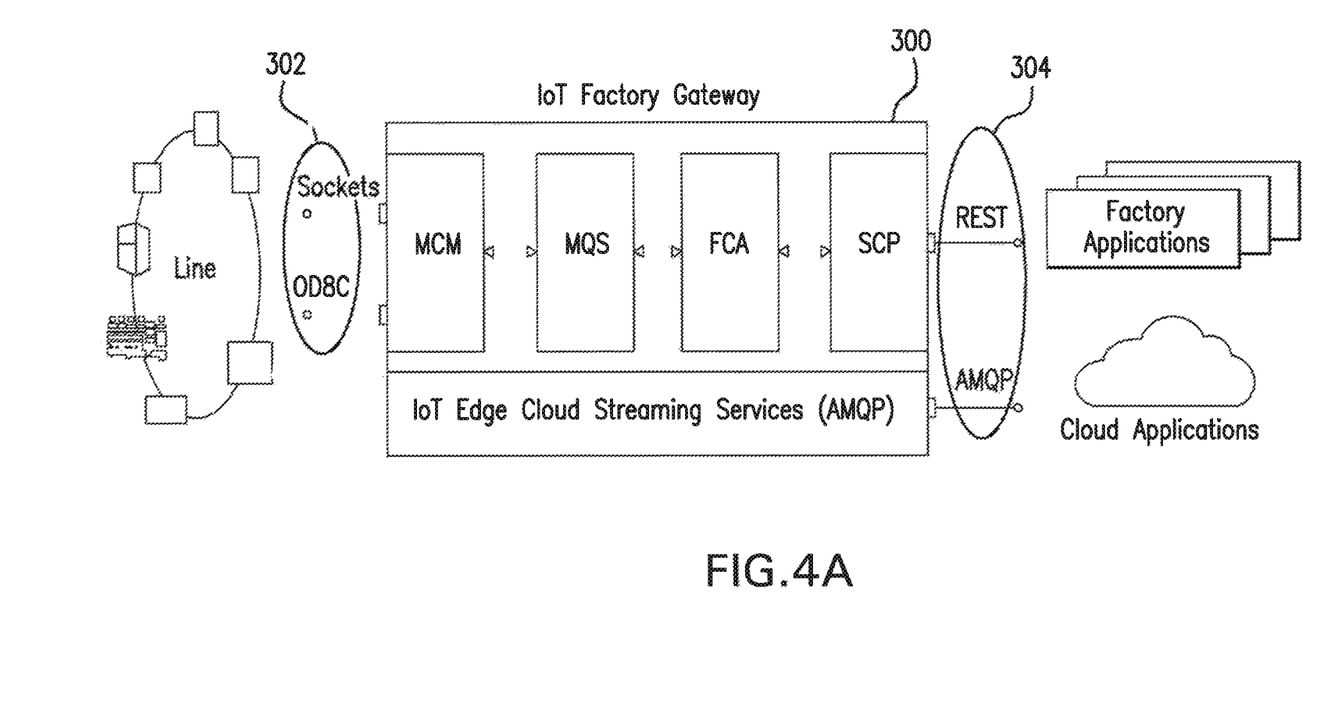
FIGS. 4A, 4B, and 4C are illustrations of embodiments of the disclosure.
Figure 4B:
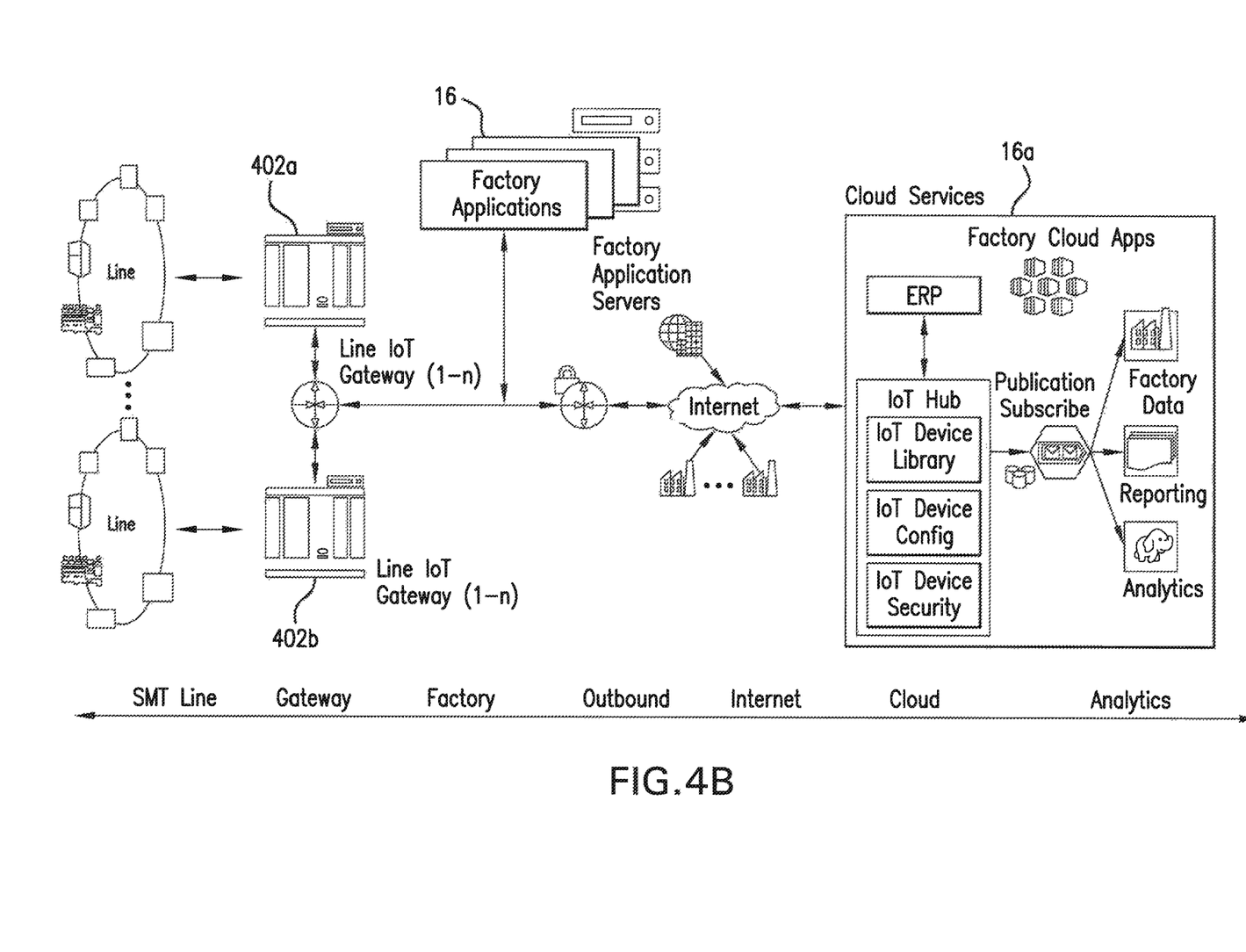
Figure 4C:
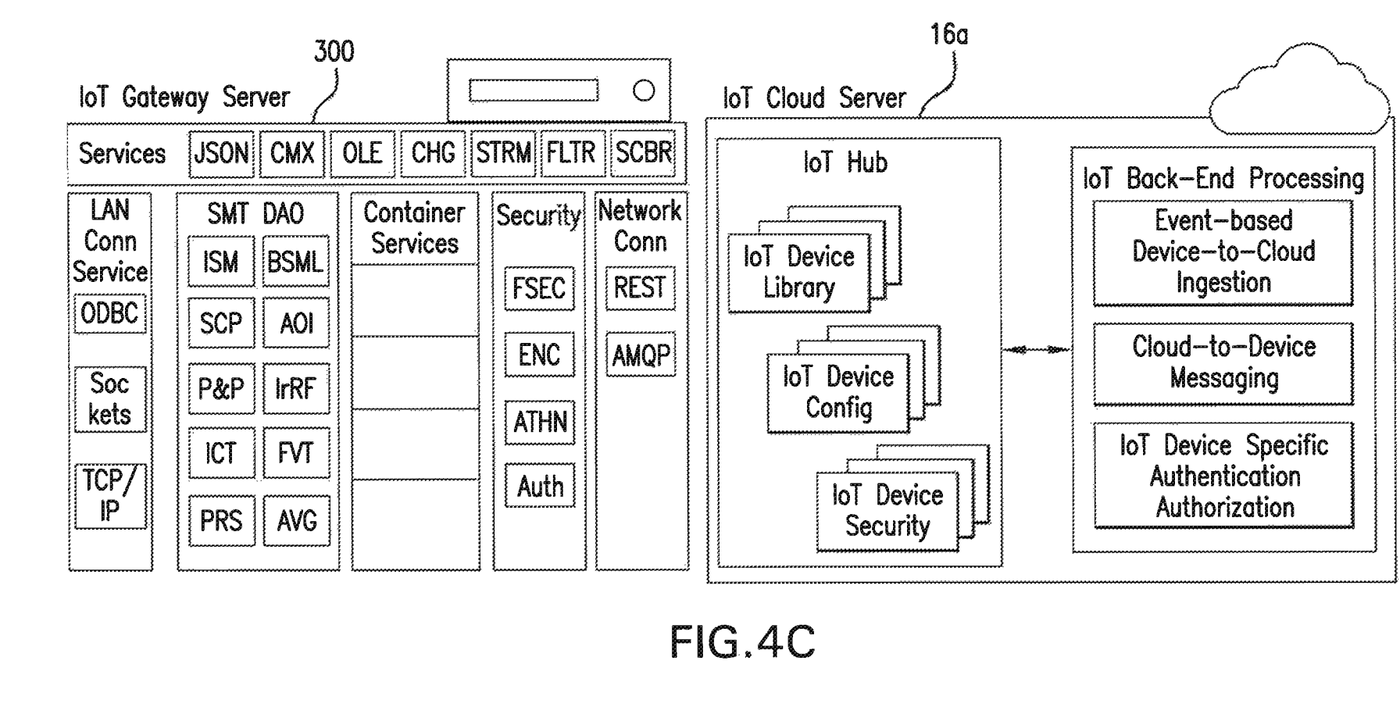

FIGS. 4A, 4B, and 4C illustrate the gateway 300 discussed above utilizing IoT with a modular connection methodology 302 to securely gather data from a variety of different machines. This supports all data and communications standards that are LAN or WiFi based, i.e., that are network connected, including via the Internet, and makes the data conveniently and securely available on a federated secure corporate enterprise network.

The gateway provides a secure IoT data collection portal 402a, 402b. It collects data from a wide variety of machines that use standard and proprietary communications protocols. It provides several data services that scrub, cleanse, filter and re-package the data into common message schema. It makes the data conveniently available 304 to any application throughout the enterprise, cloud or across a network, such as the Internet.

The gateway utilizes industry standard data, communications and security standards to simplify enterprise integration. The gateway uses a modular data interface scheme for each machine to manage communications, data, and security, thus allowing virtually any machine that is Ethernet LAN or WAN capable to exchange data with the gateway.

Factories are typically a collection of many machines, both old and new. Factories may purchase many machines over several years from many vendors. Machines models evolve over time with new or different features. Newer machines may include new standards and features. Older machine may not include all interfaces. The gateway uses modular connectivity to manage the differences between multiple machines. Each unique machine type has its own unique connection module that manages communications and data schema differences. This allows integration of old and new machines.

Data normalization allows gateway modules to provide a consistent Applications Programming Interface (API). It manages the differences in features and data schemas, so that applications don't need to be machine vendor/model/version aware. The gateway thus fully supports factory inventory interoperability.

The Gateway may be an on-premise gateway server. As highlighted in FIG. 5, the machine side of the server 502 collects data from a variety of factory machines. On the enterprise network side 504, it provides a secure IoT portal for many factory and enterprise applications.

Figure 5:
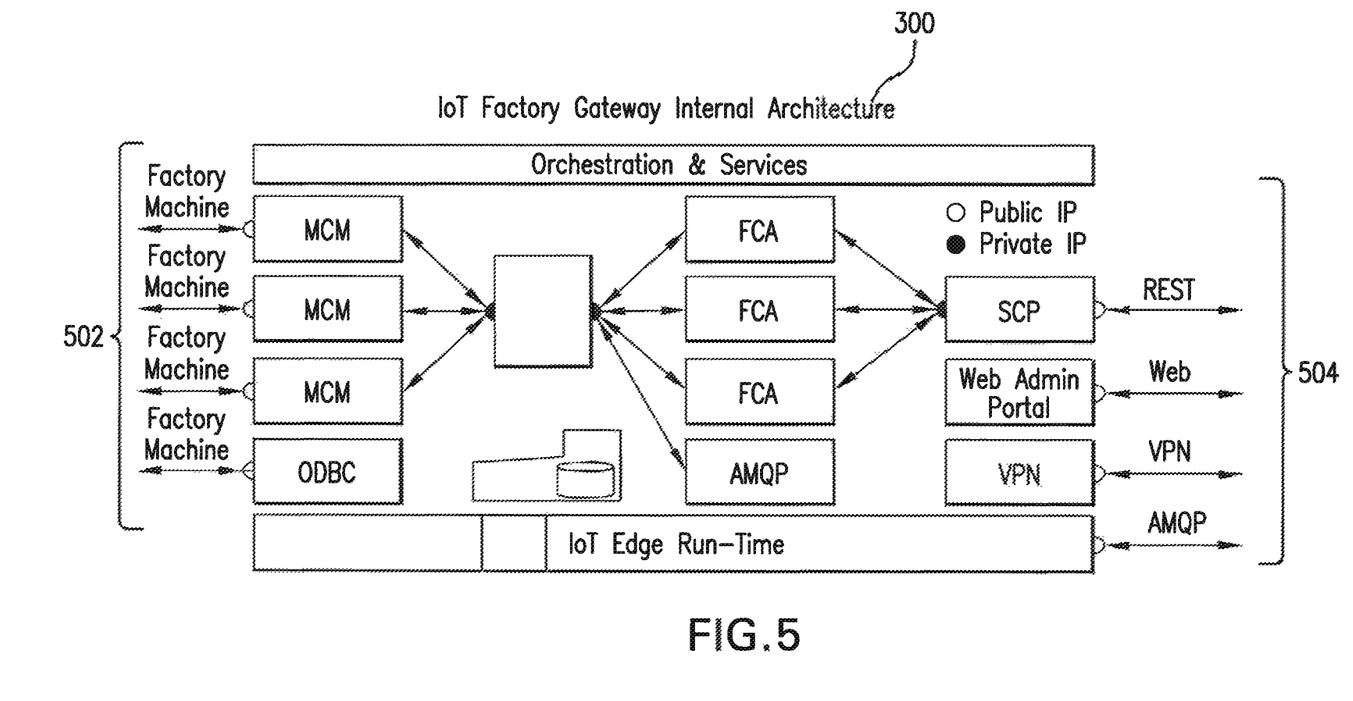
FIG. 5 is an illustration of an embodiment of the disclosure.

Internally the gateway 300 may include, by way of non-limiting example, 5 components; Machine Connectivity Module (MCM), Message Queuing Services (MQS), Factory Container Application (FCA), Secure Communications Portal (SCP) and Cloud Interface (AMQP).

The MQS, SCP and AMQP services are static port and are fixed during compile time. The MCM and FCA modules are dynamic. They are loaded at runtime and use dynamic IP Port networking to wire-up to gateway services. Abstract frameworks are provided for container class services and interoperability.

The gateway architecture may configure to any machine environment using dynamically loaded services. No system compile is thus required. This allows a very versatile application that can dynamically adapt to any factory environment.

The gateway may include a dual LAN hardware connection. The machine side LAN connection may have its own local domain IP address. The local LAN is a local VLAN configured domain with no enterprise LAN or internet access. The enterprise LAN connection also may have its own address and is connected to the enterprise LAN.

The Machine Connectivity Module (MCM) may provide the unique connectivity requirements of each machine and a common data message queuing interface. The MCM may be a 2-way module—i.e., it collects data from the machine as well as sends command and control information. The MCM may be unique to each machine vendor/model/version.

That is, several versions of the MCM may be required to support different machine models/versions. The machine side of the MCM supports TCP/IP sockets, and/or Open Database Connection (ODBC), by way of example, for connecting to SQL databases and HTTP/HTTPS. The messaging side of the MCM supports MQTT messaging protocol. MCM messaging is published to the MQS. The schema may be different for each MCM type. The MCM also may get command and control information by subscribing to unique MQS topics. The MCM is a dynamic container microservice that may be loaded at runtime.

The Message Queuing Service (MQS) may provide message multiplexing between the MCM and FCA's. Each MCM publishes data identified with unique topics to the MQS. The FCA's subscribe to the topics and extract the messages. FCA's may subscribe to multiple topics. The MQS reduced the complexity of multiplexing multiple messages between MCM and FCA's. The MQS also passes command and control messages from the FCA's and MCM's. The MQS is a static container microservice. The microservice is defined at compile time and has a fixed set of DNS names for publication and subscription ports.

The Factory Container Applications (FCA) are microservices that are responsible for directly interfacing with the various factory, enterprise or cloud applications. FCA's subscribe to one or more MQS topics and forward data to the Secure Communications Portal (SCP). The SCP forwards the messages to their respective application(s). Factory, enterprise or cloud applications can also send command and control data directly to machines through FCA's.

The FCA receives command and control information from the SCP and repackages it into MQTT messages. It then forwards the message(s) the MQS. The appropriate MCM eventually gets the command and control message and forwards to the machine. FCA's are dynamic containers and are loaded at run time. FCA's may provide specialized data for various applications.

The Secure Communications Portal (SCP) handles all secure access to the enterprise LAN. Data being sent to an application is embedded within an HTTPS header. A security token is added to the header and the data is encrypted and sent to the application. The security token provides authentication and authorization credentials to the application. The application checks the token credentials and if valid will process the request. If the credentials are invalid the application will end the session with an HTTP 401 error code. The application can also pass command and control information to a machine through the SCP. The SCP decrypts the data and extracts the security token. The SCP validates the credentials and if valid the command is allowed. If the credentials are invalid the session is ended with a HTTP 401 error.

The gateway also provides a cloud streaming AMQP messaging service. AMQP messages can be streamed to hub data services. Factory, cloud and enterprise applications may access the AMQP endpoint and subscript to specific data topics. The streaming service is supported by AMQP container microservice. The AMQP container is a dynamic service and is loaded at run time. AMQP subscribes to various topics from the MQS. The data is extracted and sent to a Run Time Engine. The runtime engine packages up the data into AMQP messages and sends them to the hub service running in the cloud. The runtime engine also provides several additional services including configuration, messaging, device security and authentication and authorization. The hub running in the cloud provides several back-end processing services and application data endpoints.

The gateway provides several service container microservices. The Web Administrator is a secure web portal that allows administrators to see gateway status, provision services and configure/edit service tables. The persistent storage is primarily for saving state information and configuration tables. The remote VPN service allows access to the private LAN within the gateway.

The gateway 300 may be an "On-Premise" server, as discussed herein. Illustrated in FIG. 6, the gateway 300 provides data connectivity from the factory floor machines 602 to factory MES, enterprise, and cloud-based, applications 604, 606.

Figure 6:
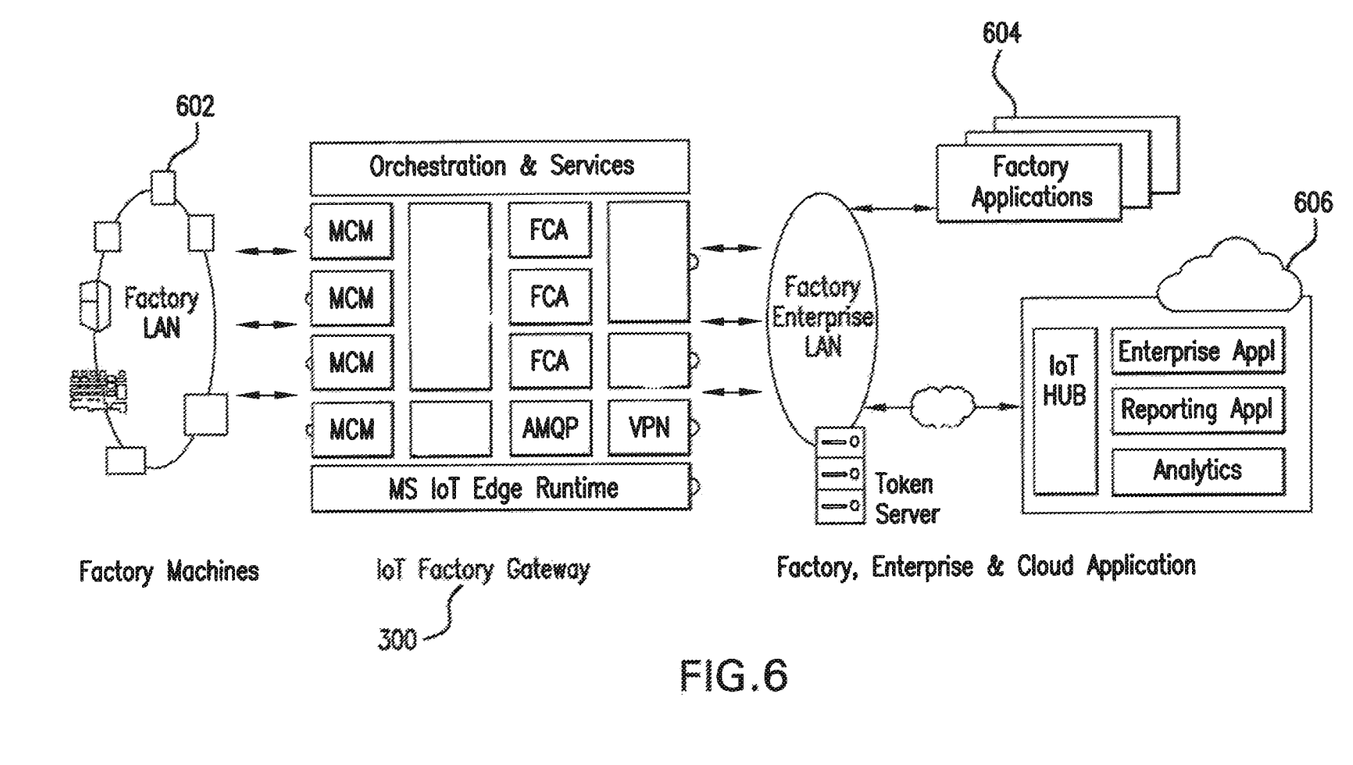
FIG. 6 is an illustration of an embodiment of the disclosure.
Figure 7:
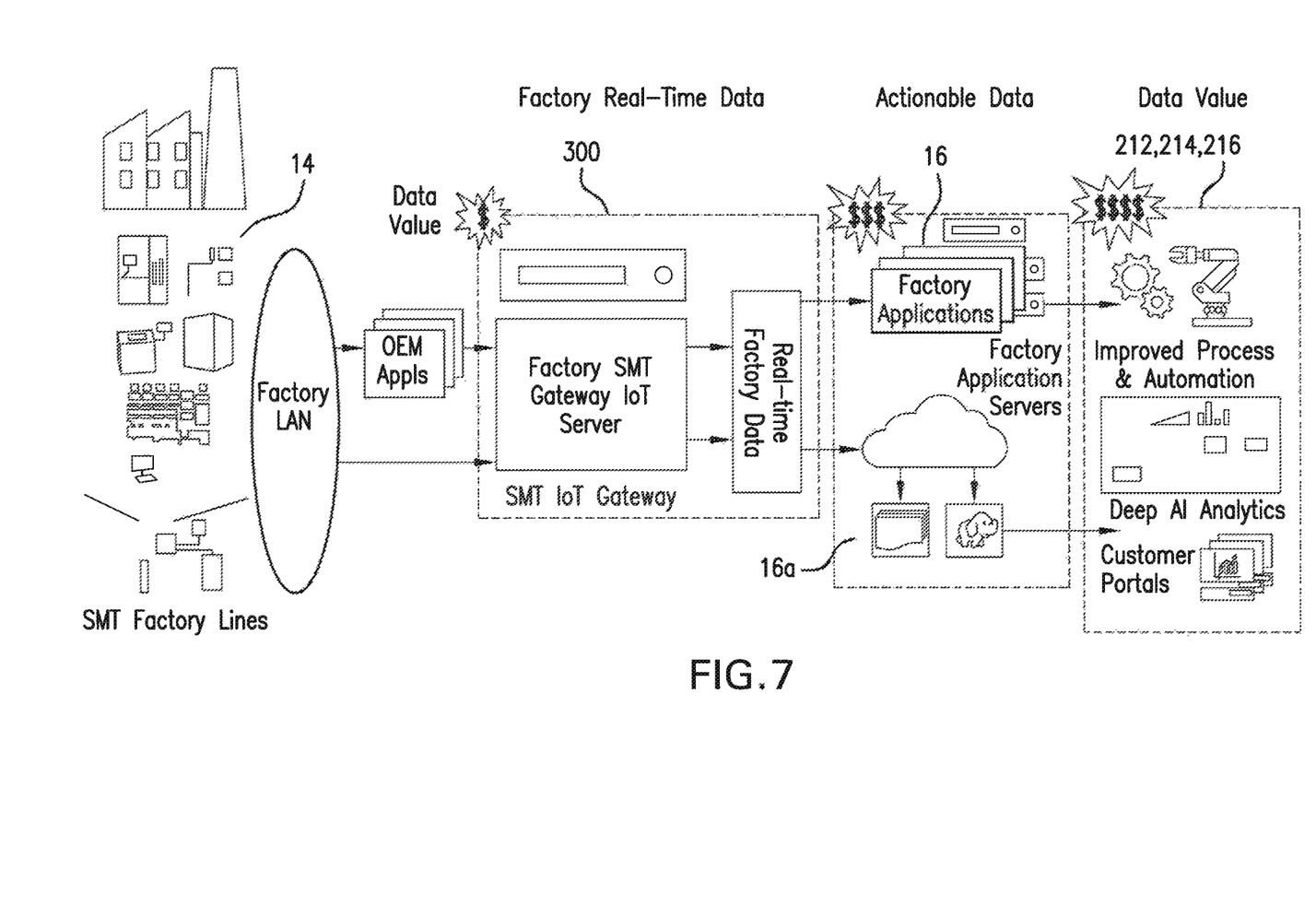
FIG. 7 is an illustration of an embodiment of the disclosure.

The MCM side of the gateway connects directly to the factory floor machine LAN. Each machine uses sockets with a proprietary protocol running on top of sockets TCP/IP. As highlighted earlier, the MCM manages the individual machine proprietary sockets protocol and machine data. The gateway does not provide any network or application security facilities on the factory LAN.

The SCP side of the gateway is connected to the factory Enterprise LAN. The connected interfaces may include the SCP, Web Administration portal, remote VPN, and AMQP streaming message service. The SCP interface handles all real-time connections to all factory applications. The AMQP interface is a messaging protocol that is real-time streamed to the cloud-based hub. The hub manages publication and subscription requests. The Web Administration portal is a status and debug port. It provides gateway status information, current state, and view/edit of orchestration and provisioning tables. Finally, a remote VPN is provided that allows direct access to the private IP services inside the gateway.

The SCP side of the gateway is highly secure. All interfaces may utilize encryption, authentication and authorization for all outbound and inbound connections. The SCP and Web Administration portals may use HTTPS for encryption. For authentication and authorization, encrypted temporal tokens created may be used.

The gateway may thus get data from various machines on the factory floor and securely deliver to applications. The gateway may also handle command and control information from the applications and route it to the factory machines. There may be 3 classes of gateway applications; factory, enterprise and reporting, and analytic applications.

Factory application may run on factory servers and may require real-time data and command and control of the line machines. Enterprise and Reporting applications typically run in the cloud and may extract data from AMQP messages.

Analytics applications may come in 2 classes; historical and real-time process control. Historical analyzes data over specific time periods. Output from analytics are used to modify large multi-processes. Real-time analytics extracts data in real-time and makes process changes in real-time. Both application classes generally use AMQP messaging data but also utilized command and control to modify machine operation.

The disclosed gateway architecture may be employed as a 2-way data collection server for unsecure Surface Mount Technology (SMT) machines. It multiplexes the data to various modular data scrubbing and filtering services and then securely forwards the data across an enterprise LAN to various Manufacturing Execution System (MES), cloud or internet-based applications. It is thus a secure portal that allows factory, cloud and internet applications to control and access to SMT machine data. The data is used by analytic applications to do real time statistical Process Control (SPC) and feedback command to the machines to modify processes and behavior. The gateway may use modular microservice containers to virtualize all operations. IP virtualization enable significant flexibility for integrating new SMT machine operation without the need for re-compiling the system.

Most SMT lines have not adopted common integrated data communications standards. This makes it difficult to collect and analyze data and use the output to drive process decisions. The ability to modify and even change manufacturing processes very quickly can be a significant competitive advantage.

Further, SMT manufacturing facilities have many machines from different vendors, models, and different versions. Any solution that is considering integration of large inventories of machines must be able to handle the differences of each machines. Individual SMT machines all have their own unique data, data schema and communications protocols. The gateway takes into account these factory variances and uses the concept of Unique machine module (UMM) data capture. That is, a small unique module of code is written for each machine vendor, model, and machine type. The modules can be used multiple times for multiple like machines. A configuration file may be used to identify each machine type on an SMT line.

The UMM may capture the data using a machine-unique interface. The UMM interfaces to an Abstract Device Object (ADO) Module. The ADO takes the data from the UMM and normalizes it to a standard messaging format before it is sent to the message multiplexer. This enables multiple machines from multiple vendors to have a common messaging interface.

Yet further, SMT machines have very poor security. The gateway may interface to each of the unsecure SMT machines on an unsecure LAN. It takes the data and securely pushes on a secure enterprise network LAN. That is, the gateway may have a very secure interface on the enterprise network LAN side.

The gateway may thus collect data from a multitude of machines. Machines may be grouped in specific functionality. For example, machines like Pick and Place (P&P) or Solder Screen Printers (SSP) report data that is very similar. The UMM extract data from each of the machines and then normalizes the data. This normalization allows all devices to have a common interface to factory applications. Each of these common data types is mapped to a specific topic tag. Data is collected and normalized to its common data type. It is then given a specific topic tag and publishes the messages using this tag. Applications that are requesting common information can use the tag as a subscription topic to extract data from the message multiplexer.

The data collected may be delivered to various enterprise applications-some factory MES applications, some cloud-based analytics applications, and other internet-based applications. These applications may get their data from Factory Container Applications (FCA). Although the gateway is a generic data gathering and distribution application, specific manufacturing facilities may need very specific information from the factory machines. This specific data being gathering mechanism is the responsibility of the FCA.

The SMT FCA's may be containerized microservices that are architected to be designed, written, tested and deployed in just a few weeks. Factory engineers can develop FCA's that create data unique to that factory and factory applications. FCA uses topic subscriptions to extract data from the message multiplexer. Using common DNS addressing, the FCA can be dynamically loaded and access the data using dynamic TCP/IP addressing without the need to compile a new release of IoT Factory Gateway.

Factory MES applications for SMT (or other applications) may need real-time data from various machines. The IoT Factory Gateway provides a convenient programming model using FCA and secure access portals to access multiple machines all at once. Instead of having to access multiple machines to collect data, the gateway provides a single secure and convenient interface.

Factory status dashboards need real-time data from various machines. The gateway provides a convenient programming model using the common machine interfaces and FCA to collect the data through a single data portal. Instead of having to access multiple machines to collect data, the gateway provides a single secure and convenient interface.

Further, the gateway provides a convenient programming model using the common machine interfaces and FCA to collect real-time data through a single data portal. Thus, instead of having to access multiple machines to collect data, IoT Factory Gateway provides a single secure and convenient interface.

Machines may be connected to the cloud based gateway with secure remote VPN connections. VPN servers may be placed in the factory and all machines would be virtually connected to the remote VPN. The gateway connects to the factory VPN and can access the machines as if the server is running locally in the factory. Running the gateway in the cloud requires fewer servers to be provisioned in the factory. Also managing cloud resources is much easier than managing deployed physical servers.

Yet further, a modern manufacturing facility, such as a SMT facility, is often a large collection of automated machines with varying degrees of communications compatibility-older machines, newer, and just recently purchased machines. Integrating all machines in a factory, especially a global factory, is quite a challenge when the machine inventory is a patchwork of old and new machines. The gateway solves this problem through the use of an innovative architecture and the use of MCM-Machine Communications Modules. MCM are specialized software microservices that support a specific machines communications interface. MCM are highly specific for specific machine types. They convert data and machine specific properties into a normalized data format. The MCM then provides a common API interface so that multiple programs can communicate with the MCM module. The MCM provides a common data Schema so all applications do not have to be aware of the machine manufacturer, model, accessories, or serial numbers of the connected machine.

A Method for Collecting IoT Surface Mount Technology (SMT) Line Data:

IoT Factory Gateway is 2-way data collection server for unsecure Surface Mount Technology (SMT) machines. It multiplexes the data to various modular data scrubbing and filtering services and then securely forwards the data across an enterprise LAN to various Manufacturing Execution System (MES), cloud or internet-based applications. It is a secure portal that allows factory, cloud and internet applications to control and access to SMT machine data. The data is used by analytic applications to do real time statistical Process Control (SPC) and feedback command to the machines to modify their processes and behavior. Internally the IoT Factory Gateway uses modular microservice containers to virtualize all operations. IP virtualization enable significant flexibility for integrating new SMT machine operation without the need for re-compiling the system.

A Generalized Factory Data Capture Method:

Most SMT lines have not adopted common integrated data communications standards. This makes it difficult to collect and analyze data and use the output to drive process decisions. Another key consideration is manufacturing facilities have many machines from different vendors, models, and different versions. Any solution that is considering integration of large inventories of machines must be able to handle the differences of each machines. Individual SMT machines all have their own unique data, data schema and communications protocols. IoT Factory Gateway considers the factory variances and uses the concept of Unique Machine Communications Module (MCM) data capture. A small unique module of code is written for each machine vendor, model, and machine type. There may even be unique modules that handle variances between machine types due to release versions of hardware or software. The modules can be used multiple times for multiple like machines. A configuration file is used to identify each machine type on an SMT line. The module is loaded using the configuration file for each machine. The configuration file also helps with the setup of each module handling unique machine characteristics. Each of these modules publishes data to a message multiplexer. The message multiplexer uses topics to tag each specific message. The IoT Factory Gateway then uses multiple special Factory Container Applications (FCA) to subscribe to the messages using the topics assigned to the messages. The FCA's refactor, scrub, and filter the message data. They then securely forward the data to factory, cloud, or internet applications. A unique aspect is that this allows integration of all factory machine no matter the manufacturer, model, serial number, or revision level. The MCM integrates all factory machines into one data collection center. There may be some newer standard interfaces but most of the inventory of factory machines would not have the capability of exploiting this standard. IoT Factory Gateway along with the MCM allows almost instantaneous integration of a diverse number of factory machines.

Abstract Device Objects:

The UMM data captures the data using the machine unique interface. The UMM interfaces to an Abstract Device Object (ADO) Module. The ADO takes the data from the UMM and normalizes it to a standard messaging format before it is sent to the message multiplexer. This enables multiple machines from multiple vendors to have a common messaging interface. FCA's do not have to have a unique knowledge for each machine interface or machine type. The FCA does not care if it is communicating with machine manufacture A or machine manufacture B. The interface is consistent across all machines. This makes development of the FCA's and the enterprise applications much easier.

Coupling Unsecure Network with Secure Network:

SMT machines have very poor security. IoT Factory Gateway interfaces to each of the unsecure SMT machines on an unsecure LAN. It takes the data and securely pushes on a secure enterprise network LAN. The IoT Factory Gateway, by design, does not have a physical or virtual connection between the two LANs. Instead, IoT Factory Gateway has a very secure interface on the enterprise network LAN side. It utilizes HTTPS to secure data going both in and out of the Gateway. It also uses secure OAUTH2 temporal tokens to pass authentication and resource authentication credentials. The IoT Factory Gateway uses the authentication and authorization credentials to block unauthorized access on both sides of data networks. By using isolated LAN on the SMT side and managing the access on the corporate side, IoT Factory Gateway provides a highly secure interface to a very unsecure manufacturing SMT network.

Secure IoT Factory Gateway Interface:

The IoT Factory Gateway has 2 primary interfaces called REST interface and the AMQP interface. These interfaces are used by all applications to securely access data and control all factory machines. The REST and AMQP interface uses X.509 certificates to create a secure HTTPS encrypted connection between the gateway and applications. The secure connections are created during a session connection called a TLS handshake. Both the REST and AMQP interfaces also use SAML to obtain a secure token from an enterprise established OAUTH2 secure token server. The tokens are an encrypted data structures that include the applications authentication and authorization credentials, Time Alive, and a Nonce. The authentication credentials contain the resource id. The authorization credentials describe what resources the application can access. The Time Alive validates how long the token is valid. Once the Time Alive has expired the token can no longer be accepted. The nonce is a random number that scrambles the token's digital signature, so no 2 tokens are the same. The advantage of a token is that applications only need to obtain a single token over a predetermined period. Once the token expires a new one must be re-acquired. If the token is acquired by an unauthorized application, it is valid only for a short period of time. The IoT factory gateway server receives the token, decrypts it, validates the token security components, and if correct allows access to the IoT Factory Gateway services, machine data, and machine control.

Multiplexed Routing of IoT Data Topics:

The IoT Factory Gateway collects data from a multitude of machines. Machines are grouped in specific functionality. Machines like Pick and Place (P&P) or Solder Screen Printers (SSP) report data that is very similar. There are some minor differences but for the most part the data is very similar. The UMM extract data from each of the machines and then normalized the data. This normalization allows all devices to have a common interface to factory applications. Each of these common data types is mapped to a specific topic tag. Data is collected and normalized to its common data type. It is then given a specific topic tag and publishes the messages using this tag. Applications that are requesting common information can use the tag as a subscription topic to extract data from the message multiplexer. This concept for IoT Factory Gateway enables a fire and forget message system. It eliminates the need for complex redirect tables. Using message multiplexing also can significantly increase the reliability of message delivery by only deleted the message after it has been acknowledged by the FCA that it has been received.

IoT Factory Container Applications and Common Interfaces:

The IoT Factory Gateway collects data from various SMT machines. The data that is eventually collected is delivered to various enterprise applications-some factory MES applications, some cloud-based analytics applications, and other internet-based applications. These applications get their data from Factory Container Applications (FCA). Although the IoT Factory Gateway is a generic data gathering and distribution application, specific manufacturing facilities may need very specific information from the factory machines. This specific data being gathering mechanism is the responsibility of the FCA. The FCA's are containerized microservices that architected to be designed, written, tested and deployed in just a few weeks. Factory engineers can develop their own FCA's that create data unique to that factory and factory applications. FCA uses topic subscriptions to extract data from the message multiplexer. Using common DNS addressing, the FCA can be dynamically loaded and access the data using dynamic TCP/IP addressing without the need to compile a new release of IoT Factory Gateway A Method of Factory Manufacturing Execution Systems (MES) Applications for Getting Data:

Factory MES applications need real-time data from various machines. The IoT Factory Gateway provides a convenient programming model using FCA and secure access portals to access multiple machines all at once. Instead of having to access multiple machines to collect data, IoT Factory Gateway provides a single secure and convenient interface.

A Method for Collecting Data for Factory Status Dashboards:

Factory status dashboards need real-time data from various machines. The IoT Factory Gateway provides a convenient programming model using the common machine interfaces and FCA to collect the data through a single data portal. Instead of having to access multiple machines to collect data, IoT Factory Gateway provides a single secure and convenient interface.

A Method for Collecting Real Time Factory Data for Real Time Factory Process Control:

Factory process control needs real-time data to manage and update machine control. The IoT Factory Gateway provides a convenient programming model using the common machine interfaces and FCA to collect real-time data through a single data portal. Instead of having to access multiple machines to collect data, IoT Factory Gateway provides a single secure and convenient interface.

Cloud Based VPN IoT Factory Gateway:

The IoT Factory Gateway has been described as an "on-premise" server. This means a unique server and associated networking hardware is required to run this resource in a factory. A cloud-based VPN IoT Factory Gateway would instead run the IoT Factory Gateway function in the cloud. Machines would be connected to the cloud based IoT Factory Gateway with secure remote VPN connections. VPN servers would be placed in the factory and all machines would be virtually connected to the remote VPN. The IoT Factory Gateway would connect to the factory VPN and can access the machines as if the server was running locally in the factory. Running the IoT Factory Gateway in the cloud requires fewer servers to be provisioned in the factory. Also managing cloud resources is much easier than managing deployed physical servers.

A Way to Connect to a Plurality of Legacy Machines:

A modern manufacturing facility is often a large collection of automated machines with varying degrees of communications compatibility-Older machines, newer, and just recently purchased machines. Integrating all machines in a factory, especially a global factory, is quite a challenge when the machine inventory is a patchwork of old and new machines. If you focus on just the newest machines a large inventory of the factory's machines may not be able to connect into the IoT network. If you focus on just one standard, you may leave out many machines. This problem can be a nightmare for manufacturing facilities planning. IoT Factory Gateway solves this problem through the use of an innovative architecture though the use of MCM-Machine Communications Modules. MCM are specialized software microservices that support a specific machines communications interface. MCM are highly specific for specific machine types. The IoT Factory Gateway dynamically loads all necessary MCM needed to support all factory IoT communications integration using configuration tables. Once the MCM connects to the machine it converts its data and machine specific properties into a normalized data format. The MCM then provides a common API interface so that multiple programs can communicate with the MCM module. The MCM provides a common data Schema so all applications do not have to be aware of the machine manufacturer, model, accessories, or serial numbers of the connected machine. It handles all the data normalization and provides a common interface to the factory applications making integration of large factory machine much simpler.

The embodiments may use an exemplary computing system, such as for the computing and processing systems discussed in association with the herein described systems and methods. Computing system is and is capable of executing software, such as an operating system (OS) and/or one or more computing applications/algorithms, such as applications discussed herein, by sending data from, and by using data, at one or more I/O ports.

The operation of an exemplary computing system is controlled primarily by computer readable instructions, such as instructions stored in a computer readable storage medium, such as hard disk drive (HDD), optical disk, such as a CD or DVD, solid state drive such as a USB "thumb drive," or the like. Such instructions may be executed within a central processing unit (CPU) to cause the computing system to perform the operations discussed throughout. In many known computer servers, workstations, personal computers, and the like, CPU is implemented in an integrated circuit called a processor.

Memory devices coupled to store data for use by the CPU(s) may include random access memory (RAM) and/or read only memory (ROM). Such memories include circuitry that allows information to be stored and retrieved.

Further, computing system may couple to an external communication network, which may include or provide access to the Internet, an intranet, an extranet, or the like. Communications network may also provide user access for computing system with means of communicating and transferring software and information electronically.

It is appreciated that the exemplary computing system discussed is merely illustrative of a computing environment in which the herein described systems and methods may operate, and does not limit the implementation of the herein described systems and methods in computing environments having differing components and configurations. That is to say, the concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A system for collecting real time manufacturing data from a factory having multiple unsecure Surface Mount Technology (SMT) machines therein using internet-of-things (IoT) connectivity, comprising:
   a gateway configured to:
   receive data from the multiple SMT machines on an unsecured network side of the gateway, wherein the received data comprises a module of code that identifies respective ones of the multiple SMT machines;
   group the identified multiple SMT machines based on functionality;
   normalize the received data to a standard messaging format based on a group of SMT machines, wherein messages are tagged and subscribed to based on topics;
   receive a request for information from at least one application of a plurality of applications on a secured network side of the gateway, wherein the request comprises a tag to extract a message associated with the group of SMT machines; and
   load, based on the tag included in the request, at least one machine communications module (MCM) on the secured network side of the gateway; and
   output command and control information, via the at least one MCM, from the at least one application on the secured network side of the gateway to the group of SMT machines on the unsecured network side of the gateway to directly control operations of the group of SMT machines.

2. The system of claim 1, wherein the at least one application comprises at least descriptive, diagnostic, predictive and prescriptive analytics.

3. The system of claim 1, further comprising a plurality of hardware sensors that provide the data of the multiple SMT machines.

4. The system of claim 1, wherein the multiple SMT machines comprise one set of machines configured to operate using one data schema and another set of machines configured to operate using another data schema.

5. The system of claim 1, wherein the command and control information results from substantially continuous feedback.

6. The system of claim 1, wherein ones of the applications are cloud-based.

7. The system of claim 1, wherein the receipt of the data from the multiple SMT machines occurs wirelessly.

8. The system of claim 1, wherein the receipt of the data from the multiple SMT machines is wired.

9. The system of claim 1, wherein the MCM comprises modularized microservices.

10. The system of claim 9, wherein the modularized microservices are modularized by a type of the multiple machines.

11. The system of claim 1, wherein the gateway is further configured to dynamically load the at least one MCM based on configuration tables.

12. The system of claim 1, wherein the gateway is further configured to identify the type of machine based on a configuration file.

13. The system of claim 1, wherein the at least one MCM is further configured to provide data to the at least one application via a message multiplexer that tags the messages.

* * * * *